(12) United States Patent
Kilkki

(10) Patent No.: US 7,693,057 B2
(45) Date of Patent: Apr. 6, 2010

(54) METHOD, NETWORK ELEMENT AND TERMINAL DEVICE FOR MARKING DATA PACKETS

(75) Inventor: Kalevi Kilkki, Espoo (FI)

(73) Assignee: Nokia Corporation, Espoo (FI)

( * ) Notice: Subject to any disclaimer, the term of this patent is extended or adjusted under 35 U.S.C. 154(b) by 1247 days.

(21) Appl. No.: 10/487,111

(22) PCT Filed: Aug. 17, 2001

(86) PCT No.: PCT/EP01/09515

§ 371 (c)(1),
(2), (4) Date: Jul. 15, 2004

(87) PCT Pub. No.: WO03/017587

PCT Pub. Date: Feb. 27, 2003

(65) Prior Publication Data

US 2005/0018690 A1    Jan. 27, 2005

(51) Int. Cl.
H04L 12/56    (2006.01)
(52) U.S. Cl. ............... 370/230.1; 370/232; 370/395.4
(58) Field of Classification Search ............... 370/232, 370/230, 235, 412, 389, 465, 230.1, 395.4; 709/232, 231, 228, 223
See application file for complete search history.

(56) References Cited

U.S. PATENT DOCUMENTS

| 5,282,203 | A |   | 1/1994  | Oouchi ................... 370/232 |
| 5,684,798 | A |   | 11/1997 | Gauthier .................. 370/395 |
| 5,754,783 | A | * | 5/1998  | Mendelson et al. ......... 709/217 |
| 6,011,778 | A | * | 1/2000  | Kilkki et al. ............. 370/232 |
| 6,023,453 | A | * | 2/2000  | Ruutu et al. .............. 370/229 |
| 6,047,326 | A | * | 4/2000  | Kilkki ................... 709/228 |
| 6,081,505 | A |   | 6/2000  | Kilkki ................... 370/230 |
| 6,081,843 | A | * | 6/2000  | Kilkki et al. ............. 709/232 |
| 6,154,769 | A |   | 11/2000 | Cherkasova et al. ......... 709/207 |
| 6,163,808 | A | * | 12/2000 | Kilkki ................... 709/233 |
| 6,167,030 | A | * | 12/2000 | Kilkki et al. ............. 370/236 |
| 6,219,358 | B1 | * | 4/2001  | Pinder et al. .............. 370/537 |
| 6,249,816 | B1 | * | 6/2001  | Kilkki ................... 709/223 |

(Continued)

FOREIGN PATENT DOCUMENTS

EP    0847166 A1  *  6/1998

(Continued)

OTHER PUBLICATIONS

Relating flow level requirements to DiffServ packet level mechanisms; E Nyberg, S Aalto, J Virtamo—Helisinki University of Technology, Heliskini 2001.*

(Continued)

*Primary Examiner*—Salman Ahmed
(74) *Attorney, Agent, or Firm*—Alston & Bird LLP

(57) ABSTRACT

A method and network element for marking data packets to be transmitted in a packet switched network with a priority information I, the packets being treated in the network according to the priority information I. The priority information I is calculated based on a required bit rate $B_{SIO}$. The priority information I may be additionally calculated based on a nominal bit rate NBR and on a momentary bit rate MBR, such that a terminal device used with the network element is able to inform the network element in advance about the required bit rate.

12 Claims, 2 Drawing Sheets

U.S. PATENT DOCUMENTS

| | | | |
|---|---|---|---|
| 6,307,838 B1 * | 10/2001 | Haas | 370/233 |
| 6,370,520 B1 * | 4/2002 | Ruutu et al. | 707/1 |
| 6,411,617 B1 * | 6/2002 | Kilkki et al. | 370/353 |
| 6,421,335 B1 * | 7/2002 | Kilkki et al. | 370/342 |
| 6,477,147 B1 | 11/2002 | Bocking et al. | 370/236 |
| 6,490,287 B1 * | 12/2002 | Kilkki | 370/395.42 |
| 6,522,653 B1 * | 2/2003 | Kilkki | 370/395.42 |
| 6,549,514 B1 * | 4/2003 | Kilkki et al. | 370/231 |
| 6,549,938 B1 * | 4/2003 | Kilkki et al. | 709/207 |
| 6,693,887 B2 * | 2/2004 | Stanwood et al. | 370/338 |
| 6,775,267 B1 * | 8/2004 | Kung et al. | 370/352 |
| 6,868,061 B1 * | 3/2005 | Kilkki et al. | 370/230.1 |
| 6,912,225 B1 * | 6/2005 | Kohzuki et al. | 370/412 |
| 7,027,395 B2 | 4/2006 | Elloumi et al. | 370/231 |
| 7,031,259 B1 * | 4/2006 | Guttman et al. | 370/235 |
| 7,103,004 B2 * | 9/2006 | Wang | 370/252 |
| 7,289,489 B1 * | 10/2007 | Kung et al. | 370/352 |
| 7,593,399 B2 * | 9/2009 | Nishihara | 370/389 |
| 2002/0031089 A1 | 3/2002 | Elloumi et al. | 370/235 |
| 2002/0154640 A1 * | 10/2002 | Wei | 370/401 |

FOREIGN PATENT DOCUMENTS

| | | |
|---|---|---|
| EP | 0876008 * | 11/1998 |
| WO | 00/18073 | 3/2000 |
| WO | 00/25483 | 5/2000 |
| WO | WO 00/52955 | 9/2000 |

OTHER PUBLICATIONS

Performance of simple integrated media access (SIMA); JPO Ruutu, K Kilkki—Proceedings of SPIE, 1997.*

Differentiated Services Schemes and Application Feedback; MV Loukola—Proc. 1 st IEEE International Conference on Networking 1998.*

Office Action dated Sep. 20, 2007 in U.S. Appl. No. 10/484,829.
Office Action dated Mar. 17, 2008 in U.S. Appl. No. 10/484,829.
Office Action dated Jul. 9, 2008 in U.S. Appl. No. 10/484,829.

* cited by examiner

METHOD, NETWORK ELEMENT AND TERMINAL DEVICE FOR MARKING DATA PACKETS

FIELD OF THE INVENTION

The present invention relates to a method and a network element for marking data packets to be transmitted in a packet switched network with a priority information, wherein that packets are treated in that network according to the priority information. Furthermore, the invention relates to a terminal device for generating corresponding data packets to be attached with said priority information by means of such network element by using such a method.

BACKGROUND OF THE INVENTION

In common communication networks, in particular in mobile communication networks two main techniques for a data transmission are used: circuit switched data transmission and packet switched data transmission.

In the circuit switched domain a network establishes a service connection for data transmission by allocating a (radio) channel to a terminal, e.g. a mobile station, when a network host or service provider intends to transmit data via the network. Then data is transmitted via the network after the connection has been established. The radio channel is occupied by the terminal during the entire duration of the connection, even though in many cases only a small amount of data has to be transmitted.

In the packet switched domain the network transmits a data packet only when required, i.e. when data transmission has to be carried out. Thus, several terminals can use the same channel at a time. If a terminal generates a data packet, the network routes that packet via a first unattached channel to a recipient. Thus, as data transmission frequently consists of data bursts, the channels can be used in an efficient manner. This type of packet switched data transmission is used in the Internet and e.g. GPRS (General Packet Radio Service) systems and UMTS (Universal Mobile Telecommunications System) systems.

Data packets are routed in packet switched networks via mostly unpredictable routes depending on the actual data traffic and depending on the configuration of the corresponding routers. Thus, packets may encounter different delays inside the network caused e.g. by variation in occupancy levels of queues inside the routers. Furthermore, as a result, the network capacity, in particular within certain routes, has to be divided between different glows (or connections, or customers).

The division of the capacity between the different flows is controlled by the so-called SIMA (Simple Integrated Media Access) system as being described in U.S. Pat. No. 6,047,326 and U.S. Pat. No. 6,081,505.

SIMA is a way to provide QoS (Quality of Service) using differentiated services, i.e. SIMA is a complete service and implementation solution. Differentiated services is an approach to provide QoS in the internet. The basic idea is to provide relative (soft) guarantees for delivery of IP (Internet Protocol) data packets. Complex functions are left at the edges of the network. This allows simple core network routers and ensures the scalability.

According to the SIMA concept each user or application shall define only two issues before a connection is established, namely a nominal bit rate (NBR) and the selection between real-time and non-real-time service classes. NBR forms the basic relationship between charging and QoS, and it defines how the network capacity is divided among different connections during overload situations. Due to the simplicity of SIMA the network operator does not guarantee the continuous availability of NBR. Furthermore, a user or application is allowed to send data with any bit rate independently of the NBR. The strength of SIMA is its wide area of applications. SIMA does not require to build complex systems with several service classes each appropriate to only certain applications.

The Idea of SIMA is that at the network edge packets are assigned a priority for a network domain. The packets are treated in the network domain according to the priority. The priority is depending on the ratio of a measured momentary bit rate (MBR) and NBR: If the MBR exceeds the NBR the priority is dropped and if the MBR is clearly below the NBR the priority is raised. Thereby, the NBR corresponds roughly to the bandwidth allocation for a given client.

Though the SIMA model as being described in U.S. Pat. No. 6,047,326 and U.S. Pat. No. 6,081,505 has been proved to be efficient and quite flexible, it has certain limitations. One of the limitations is that most of the application using the SIMA network are assumed to be adaptive in the sense that during overload situations they can reduce the bit rate, and correspondingly, if there is free capacity they can momentarily increase their bit rate. If that assumption is valid, the network capacity is divided proportional to the NBR for each flow. Due to this property, both the service provider and the customer may consider that the position of applications with constant (unchangeable) bit rate obtains worth service that what it should be.

SUMMARY OF THE INVENTION

It is therefore an object of the present invention to improve the control of bit rates. This object is achieved by a method for marking data packets to be transmitted in a packet switched network with a priority information for treating said packets in said network according to said priority information, comprising the steps of.
  determining a required bit rate being required for an application of a certain service connection, and
  calculating said priority information depending on said required bit rate.

Furthermore, the above object is achieved by a network element for marking data packets to be transmitted in a packet switched network with a priority information for treating said packets in said network according to said priority information, comprising:
  required bit rate determining means for determining a required bit rate being required for an application of a certain service connection, and
  calculation means for calculating said priority information depending on said required bit rate.

Furthermore, the above object is achieved by a terminal device for generating data packets to be transmitted in a packet switched network, said packets being treated in said network according to a priority information being attached to said packets by means of such a network element by using such a method, said terminal device comprising:
  means for generating a bitstream with a constant bit rate flow, and
  means for generating a required bit rate information element indicating to said network element a required bit rate for a service connection for transmitting said bitstream with a constant bit rate flow.

The main idea of the invention is to provide an extension to prior art systems for marking data packets by informing the network about the required bit rate and thus calculating the priority information being attached to other data packets in order to enable the network to treat the data packets according to this priority information.

The present invention is advantageous with regard to constant bit rate applications, in particular real-time applications such as video conferencing. As due to the invention the priority information used for treating data packets in the networks takes into account a required bit rate, the probability that the MBR meets the required bit rate is increased considerably. As a result the MBR is stabilized, which is particularly advantageous from network operator viewpoint.

Furthermore, from customer viewpoint, it is particularly advantageous that in case of constant (or nearly constant) bit rate applications, the priority of the packet can be increased.

Preferably the above mentioned method further comprises the steps of:
determining a nominal bit rate allocated to said service connection,
measuring a momentary bit rate of said connection, and
calculating said priority information further depending on said nominal bit rate and said momentary bit rate.

Accordingly, it is preferred that the above mentioned network element further comprises the steps of:
nominal bit rate determining means for determining a nominal bit rate allocated to a certain service connection,
momentary bit rate measuring means for measuring a momentary bit rate said connection, and
whereby said calculation means calculating said priority information further depending on said nominal bit rate and said momentary bit rate and being connected to said nominal bit rate determining means, said momentary bit rate measuring means and said required bit rate measuring means.

As result the probability that MBR meets the required bit rate is further increased, thus further stabilizing the MBR.

Preferably, the required bit rate is provided by a user of the service connection or by an application thereof. As a result the flexibility of the user and/or a certain application of transmitting data with a certain required bit rate is increased. Particularly it is enabled to set and to change the required bit rate at any time before, during and/or after the transmission of a data packet. Thus, the required bit rate may even be changed during a certain service connection.

In a preferred embodiment the calculation of the priority information is further depending on a gain factor indicating a gain over the ratio NBR/MBR. This gain factor is used to define a benefit to be achieved over the standard NBR/MBR ratio. This gain factor can be set as a system parameter in the network/network element. Thus, further flexibility of the system is enabled.

According to a further embodiment the priority information is calculated based on a linear scale importance value that is calculated as the product of the gain factor and the NBR divided by the required bit rate if said momentary bit rate is less than or equal to the required bit rate, and is calculated to zero if the MBR is greater than the required bit rate. Thus, a threshold value is defined taking into account the fact whether or not the required bit rate is reached by the MBR.

Furthermore, it is preferred that the priority information is calculated based on a logarithmic scale importance value that in turn is calculated by dividing the logarithm of the linear scale importance value by the logarithm of a system base number and adding the result of the division to an importance value constant. Due to the logarithmic function it is possible to give a certain weight to the priority information depending on the NBR, MBR and the required bit rate.

Preferably the priority information is calculated by determining the closest integer value near said logarithmic scale importance value, determining the minimum value of this closest integer value and a constant subtracted by one, and determining the maximum value of said minimum value and zero, whereby that constant is the total number of priority or importance levels. This calculation results in an integer value that can be expressed with a small number of bits. This is particularly advantageous since a small number of bits reduces the amount of additional data for the priority Information that has to be attached to the data packets. Thus; network resources can be saved.

Preferably the data packets are treated such that a data packet comprising a value of the priority information that is higher than a value of a priority information of further data packet is transmitted before that further data packet. This enables data packets with a high priority information value to be transmitted through the network with higher probability than other data packets with a lower priority information value.

Furthermore, it is preferred, that the steps of determining the NBR, measuring the MBR, determining the required bit rate, and calculating the priority information based on the NBR, MBR and required bit rate are repeated consecutively. Thus, a continuous optimising process is provided.

Further advantageous developments are defined in dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
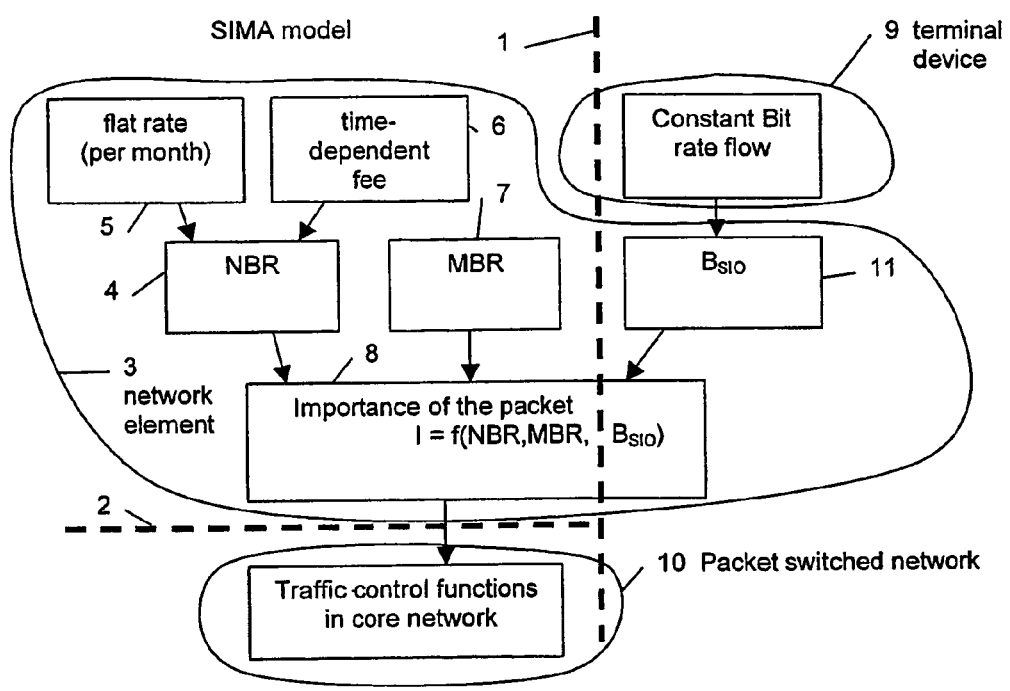
FIG. 1 shows a schematic diagram of an extension according to a preferred embodiment of the present invention to a SIMA system indicating a network element, a terminal device and a packet switched network.

FIG. 1 shows a schematic diagram of a system for marking data packets according to a preferred embodiment of the present invention. FIG. 1 indicates both, prior art components of such a system as well as new components, both forming a preferred embodiment of the present invention. Prior art components are shown on the left side of a vertical dashed line 1 which is divided by a horizontal dashed line 2 into an upper left system part and a lower left system part. The upper left system part indicates the SIMA model according to U.S. Pat. No. 6,047,326 which is incorporated herein by reference. The lower left system part indicates the traffic control functions in the core network according to U.S. Pat. No. 6,081,505 which is incorporated herein by reference as well.

The packet marking system according to U.S. Pat. No. 6,047,326 comprises a network element 3 comprising a NBR determining unit 4 for determining a NBR. This NBR is for example determined based on a per month flat rate that is provided by flat rate register 5 providing information about a certain user, i.e. whether or not a user has purchased a network access based on a flat rate and, if so, the flat rate register 5 provides further information regarding e.g. the monthly price of the flat rate.

A further register, namely a time-dependent fee register 6 provides further information whether or not a certain user has purchased a network access based on a time-dependent fee.

Both information provided by the flat rate register 5 and the time-dependent fee register 6 are provided to the NBR determining unit 4 that determines a nominal bit rate based on the information provided by the register 5 and 6.

Network 3 further comprises a MBR determining unit 7 for measuring a momentary bit rate of the data traffic, in particular the MBR of a certain connection.

The NBR is established by the network element or by a user. The value of the NBR represents an expected, however not guaranteed bit rate associated with a particular user or connection.

Network element 3 further comprises a calculation unit 8 that receives from NBR determining unit 4 and MBR determining unit 7 the NBR and the MBR, respectively, In order to compute a priority information I as a function of NBR and MBR as well as a further parameter described hereinafter.

Network element 3 operates as an access node for a terminal device 9. Terminal device 9 transmits data packets to network element 3 that are intended to be transmitted via a packet switched core network 10 to a recipient (not shown).

The data packets transmitted from the terminal device 9 to network element 3 are each assigned one of several priority levels according to the priority information computed in calculation unit 8, such as one of eight priority levels. Data packets received at the core network 10 are either accepted or discarded based on the priority information of the data packet and a status of one or more buffers at the core network 10.

According to a preferred embodiment of the present invention network element 3 further comprises a required bit rate $B_{SIO}$ determining unit 11. The required bit rate $B_{SIO}$ determining unit 11 determines a required bit rate $B_{SIO}$ from the information sent by the terminal device 9. The terminal device 9 provides this $B_{SIO}$ either as a data input by a user or as a data generated by an application of the terminal device 9. This information is to inform the network 10 and/or the network element 3 in advance about the required bit rate $B_{SIO}$. The required bit rate $B_{SIO}$ determining unit 11 extracts the $B_{SIO}$ from the bitstream received form the terminal device 9 and provides the calculation unit 8 with the corresponding $B_{SIO}$ value. Thus, the calculation unit 8 receives a third parameter for calculating the priority information I.

A thus extended SIMA system gives special support for those flows that generate a constant bit rate traffic flow with intensity known in advance. This issue has two aspects: According to a first aspect, from a network operator view point, if a user/customer informs about the required bit rate, this information can be exploited by a service provider, in particular the access node or network element 3, to manage the network more efficiently. According to a second aspect, from the customer view point, if the bit rate required by the user or an application of the user's terminal device 9 is fixed, the customer should try to optimize the service level for that bit rate.

Due to these reasons it might be advantageous to give extra gain for constant bit rate for flows used by applications with constant bit rate. The corresponding service model presented in the present invention is the so-called strictly in/out (SIO) service model. Advantageously this service model needs modification only to the packet marking system, while the core network part of the system remains unchanged.

The access part of the SIMA system can be described as the following algorithm for calculating priority information for marking data packets:

$$\tilde{I} = \max\{0, \min[N-1, \text{round}(I')]\} \quad (1)$$

$$I' = I_0 + \frac{\ln(I)}{\ln(z)} \quad (2)$$

$$I = \frac{NBR}{MBR} \quad (3)$$

In these equations the function round (x) defines the closest integer value near the value x. The function max (x, y) defines a value that is equal to x if x is greater than y. Otherwise the value of the function max (x, y) is y.

The function min (x, y) defines a value that is equal to x if x is less than y. Otherwise the function min (x, y) defines a value that is equal to y.

Furthermore, in the above equation (1) $\tilde{I}$ defines the actual value of the priority information used for importance marking of the packet with limited granularity and scale.

In the above equations I' is the priority information used for importance marking of a packet, whereby this priority information is based on a logarithmic scale with perfect granularity and unlimited scale.

Furthermore, in the above equations I is the priority information for the importance marking of a packet on linear scale.

NBR is the nominal bit rate for the flow and defines the share of resources for the flow, whereas MBR is the momentary bit rate of the flow.

Furthermore z is the base number of the system as defined in U.S. Pat. No. 6,047,326 and is preferably set to 2.

Furthermore, $I_0$ denotes an importance value constant that defines the base number of the importance scale, that is, the importance of a packet is $I_0$ if the momentary bit rate (MBR) is equal to the nominal bit rate (NBR). In the original SIMA system, the preferred $I_0$ is 4. Preferably, $I_0$ is adapted accordingly to the total number of priority or importance levels N, for instance $I_0 = \text{round}(0.625*N-1)$. Alternatively, $I_0$ may preferably be set to 4.

A preferred total number of priority or importance levels is 8, but a smaller (or larger) number is possible as well. However, in order to guarantee an appropriate function of the system under various conditions, N should be at least 6 whenever possible.

This algorithm is modified for those flows or customers that require the SIO-service in the following way:

$$\tilde{I} = \max\{0, \min[N-1, \text{round}(I')]\} \quad (4)$$

$$I' = I_0 + \frac{\ln(I)}{\ln(z)} \quad (5)$$

$$\text{if } MBR \leq B_{SIO} \text{ then } I = c_{SIO} \cdot \frac{NBR}{B_{SIO}} \quad (6)$$
$$\text{else } I = 0$$

However, $$\text{if } I < x, \text{ then } I' = 0 \quad (7)$$

(and otherwise as described above), where x is suitable constant, such as $$x = z^{-I_0} \quad (8)$$

However, any sufficiently small value is appropriate, e.g., x=0.001.

Parameter $C_{SIO}$ denotes a gain factor expressing a benefit to be achieved over the simple NBR/MBR ration calculation. Furthermore, $B_{SIO}$ denotes the required bit rate as described with reference to FIG. 1.

Figure 2:
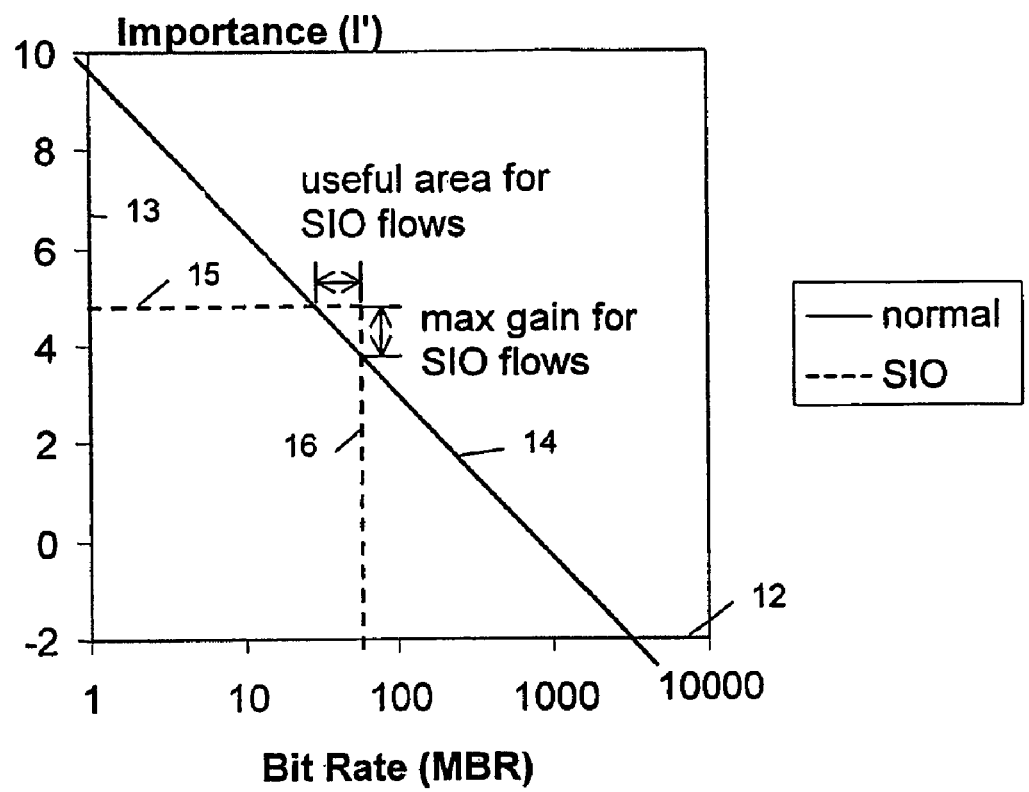
FIG. 2 shows an example of the main properties of a SIO (Strictly In/Out) service according to an embodiment of the present invention.

FIG. 2 shows the main characteristics of the corresponding SIO service model. A horizontal axis 12 denotes a momentary bit rate MBR in a logarithmic illustration. The vertical axis 13 denotes a value of a priority information I' on logarithmic scale.

A solid line 14 indicates the value of a priority information I' on logarithmic scale as being calculated according to equations (2) and (3).

Dashed lines 15 and 16 indicate a priority information value calculated based on equations (5) and (6).

In the example according to FIG. 2 the main properties of the SIO service are NBR=50 kbit/s for normal as well as for SIO service, gain factor $C_{SIO}$=2 and required bit rate $B_{SIO}$=70 kbit/s.

As shown in FIG. 2, the SIO service is advantageous for the user if the momentary bit rate MBR is substantially equal to the required bit rate $B_{SIO}$ (namely 70 kbit/s according to the example of FIG. 2) or somewhat below. This region is denoted as "useful area for SIO flows" in FIG. 2. Using the SIO service provides a maximum gain as indicated in FIG. 2 by "max gain for SIO flows". In contrast, in any other bit rate region (MBR region) the SIO service does not provide an improvement for the customer, because the importance marking with normal service would be better than that of SIO service.

The present invention provides the following advantages:

Compared with prior art SIMA system according to U.S. Pat. No. 6,047,326 and U.S. Pat. No. 6,081,505, the present invention provides an extra support for constant bit rate flows with a minor modification in the packet marking system, thereby avoiding modifications in the core network functions.

Compared to other ways to support constant bit rate flows, the present invention has the advantage that it does not require any admission control, even though such an admission control can be used. A further advantage is that the present invention does not require a per-flow traffic control in the core network. Moreover, the present invention provides seamless interoperability with other, more adaptive flows.

It should be noted that each user or application associated with a terminal device that generates constant bit rate flow can request SIO service. The only additional parameter compared to prior art solutions is the required bit rate $B_{SIO}$ that is the (assumed) bit rate needed by the application or user associated with the terminal device.

It is noted that the present invention is not restricted to the preferred embodiment described above, but can be implemented in any fixed or wireless network environment using a packet switched data transmission only or a combination of packet switched data transmission and circuit switched data transmission.

Furthermore, additional parameters may be used to calculate the priority information. Thus, the invention may vary within the scope of the attached claims.

The invention claimed is:

1. A method comprising:
   determining a required bit rate ($B_{SIO}$) being required for an application of a certain service connection;
   determining a nominal bit rate (NBR) allocated to said service connection;
   measuring a momentary bit rate (MBR) of said service connection;
   calculating, with a processor, a priority information (I) depending on said required bit rate ($B_{SIO}$), said nominal bit rate (NBR), said momentary bit rate (MBR), and on a gain factor ($C_{SIO}$) indicating a gain over a ratio of said nominal bit rate (NBR) and said momentary bit rate (MBR), wherein said priority information (I) being calculated as a linear scale importance value being calculated as the product of said gain factor ($C_{SIO}$) and said nominal bit rate (NBR) divided by said required bit rate ($B_{SIO}$) when said momentary bit rate (MBR) is less than or equal to said required bit rate ($B_{SIO}$), and being calculated to zero when said momentary bit rate (MBR) exceeds said required bit rate ($B_{SIO}$); and
   marking data packets to be transmitted in a packet switched network with said priority information (I) for treating said packets in said network according to said priority information (I).

2. The method according to claim 1, wherein said required bit rate ($B_{SIO}$), being provided by a user of said certain service connection.

3. The method according to claim 1, wherein said required bit rate ($B_{SIO}$) being provided by an application of said certain service connection.

4. The method according to claim 1, wherein said priority information (I) being calculated based on a logarithmic scale importance value (I') being calculated by dividing the logarithm of said linear scale importance value (I) by the logarithm of a system base number (z) and adding the result of said division to an importance value constant ($I_o$).

5. The method according to claim 4, wherein said priority information (I) being calculated by determining a closest integer value near said logarithmic scale importance value (I'); determining a minimum value of said closest integer value and a constant (N) subtracted by one; and determining a maximum value of said minimum value and zero, whereby said constant (N) is a total number of priority or importance levels.

6. The method according to claim 1, wherein said packets being treated such that a packet comprising a value of said priority information (I) that is higher than a value of a priority information (I) of a further packet is transmitted before said further packet.

7. The method according to claim 1, wherein said steps are repeated consecutively.

8. The method according to claim 1, wherein:
   determining the required bit rate ($B_{SIO}$) comprises determining the required bit rate ($B_{SIO}$) with a required bit rate determinator;
   determining the nominal bit rate (NBR) comprises determining the nominal bit rate (NBR) with a nominal bit rate determinator;
   measuring the momentary bit rate (MBR) comprises measuring the momentary bit rate (MBR) with a momentary bit rate measurer; and
   the processor comprises a calculator, and wherein calculating the priority information (I) comprises calculating the priority information (I) with the calculator.

9. An apparatus comprising:
   a required bit rate determinator configured to determine a required bit rate ($B_{SIO}$) being required for an application of a certain service connection;
   a nominal bit rate determinator configured to determine a nominal bit rate (NBR) allocated to a certain service connection;
   a momentary bit rate measurer configured to measure a momentary bit rate (MBR) of said connection; and a calculator configured to calculate a priority information (I) for marking data packets to be transmitted in a packet switched network with said priority information (I) for treating said packets in said network according to said priority information (I), said calculator configured to calculate said priority information (I) depending on said required bit rate ($B_{SIO}$), said nominal bit rate (NBR), said momentary bit rate (MBR), and on a gain factor ($C_{SIO}$) indicating a gain over a ratio of said nominal bit rate (NBR) and said momentary bit rate (MBR), wherein said priority information (I) being calculated as a linear scale importance value being calculated as the product of said gain factor ($C_{SIO}$) and said nominal bit rate (NBR) divided by said required bit rate ($B_{SIO}$) when said momentary bit rate (MBR) is less than or equal to said required bit rate ($B_{SIO}$), and being calculated to zero when said momentary bit rate (MBR) exceeds said required bit rate ($B_{SIO}$).

10. The apparatus according to claim 9,
whereby said calculator calculating said priority information (I) is connected to said nominal bit rate determinator, said momentary bit rate measurer and said required bit rate determinator.

11. The apparatus according to claim 9, configured to be used in a method for marking data packets to be transmitted in a packet switched network with a priority information (I) for treating said packets in said network according to said priority information (I), comprising determining a required bit rate ($B_{SIO}$) being required for an application of a certain service connection; and calculating said priority information (I) depending on said required bit rate ($B_{SIO}$).

12. An apparatus comprising:
means for determining a required bit rate ($B_{SIO}$) being required for an application of a certain service connection;
means for determining a nominal bit rate (NBR) allocated to a certain service connection;
means for measuring a momentary bit rate (MBR) of said connection; and
means for calculating priority information (I) for marking data packets to be transmitted in a packet switched network with said priority information (I) for treating said packets in said network according to said priority information (I), said means for calculating priority information (I) configured to calculate said priority information (I) depending on said required bit rate ($B_{SIO}$), said nominal bit rate (NBR), said momentary bit rate (MBR), and on a gain factor ($C_{SIO}$) indicating a gain over a ratio of said nominal bit rate (NBR) and said momentary bit rate (MBR), wherein said priority information (I) being calculated as a linear scale importance value being calculated as the product of said gain factor ($C_{SIO}$) and said nominal bit rate (NBR) divided by said required bit rate ($B_{SIO}$) when said momentary bit rate (MBR) is less than or equal to said required bit rate ($B_{SIO}$), and being calculated to zero when said momentary bit rate (MBR) exceeds said required bit rate ($B_{SIO}$).

* * * * *